United States Patent
Rider et al.

(10) Patent No.: US 7,693,070 B2
(45) Date of Patent: Apr. 6, 2010

(54) CONGESTION REDUCING RELIABLE TRANSPORT PACKET RETRY ENGINE

(75) Inventors: Scot H. Rider, Pleasant Valley, NY (US); Todd A. Strader, Hopewell Junction, NY (US); Tracy C. Phillips, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 11/686,417

(22) Filed: Mar. 15, 2007

(65) Prior Publication Data

US 2008/0225703 A1 Sep. 18, 2008

(51) Int. Cl.
*H04L 12/26* (2006.01)
*H04L 1/18* (2006.01)
*H04B 1/44* (2006.01)

(52) U.S. Cl. .................. 370/237; 370/230; 370/282; 714/749

(58) Field of Classification Search .................. None
See application file for complete search history.

(56) References Cited

U.S. PATENT DOCUMENTS

| | | | | |
|---|---|---|---|---|
| 5,036,518 | A | * | 7/1991 | Tseung .................. 714/748 |
| 5,265,103 | A | * | 11/1993 | Brightwell ............. 714/748 |
| 5,459,725 | A | * | 10/1995 | Bodner et al. .......... 370/390 |
| 5,699,367 | A | * | 12/1997 | Haartsen ................ 714/749 |
| 6,337,860 | B1 | | 1/2002 | Wicklund |
| 6,392,993 | B1 | | 5/2002 | Hamilton et al. |
| 6,415,312 | B1 | | 7/2002 | Boivie |
| 6,438,105 | B1 | * | 8/2002 | Qarni et al. ............ 370/231 |
| 6,467,059 | B1 | | 10/2002 | Ohashi |
| 6,629,318 | B1 | | 9/2003 | Radha et al. |

(Continued)

FOREIGN PATENT DOCUMENTS

EP 1 638 240 3/2006

(Continued)

OTHER PUBLICATIONS

Lin, Shu, et al., "Error Control Coding—Fundamentals and Applications," XP-002379344, Englewood Cliffs, Prentice Hall, Jan. 1, 1983, pp. 458-481.

(Continued)

*Primary Examiner*—Tri H Phan
(74) *Attorney, Agent, or Firm*—Jeffrey N. Giunta; Fleit Gibbons Gutman Bongini & Bianco P.L.

(57) ABSTRACT

A method, apparatus and computer readable medium for transmitting at least one packet across a network destined for reception by at least one network endpoint. A plurality of packets is processed sequentially from a queue to be sent to at least one network endpoint. At least a first packet from the plurality of packets is transmitted to the network endpoint. The at least first packet transmitted to the network endpoint is determined to not have been acknowledged. A first retry packet associated with the at least first packet is transmitted to the at least one network endpoint. Transmission of packets other than the first retry packet is suspended to the network endpoint. The first retry packet is determined to have been acknowledged by the at least one network endpoint. Transmission of remaining packets in the plurality of packets to the at least one network endpoint is resumed.

35 Claims, 9 Drawing Sheets

U.S. PATENT DOCUMENTS

| | | | |
|---|---|---|---|
| 6,636,488 B1 | 10/2003 | Varma | |
| 6,922,804 B2 * | 7/2005 | Das Sharma | 714/746 |
| 7,168,022 B2 * | 1/2007 | Miyake et al. | 714/748 |
| 7,450,512 B1 | 11/2008 | Young et al. | |
| 2002/0108082 A1 * | 8/2002 | McDonnell | 714/748 |
| 2003/0099211 A1 | 5/2003 | Moulsley et al. | |
| 2004/0179485 A1 | 9/2004 | Terrier | |
| 2005/0169199 A1 | 8/2005 | Futenma et al. | |
| 2005/0281243 A1 | 12/2005 | Horn et al. | |
| 2006/0023673 A1 | 2/2006 | Read | |
| 2006/0179392 A1 | 8/2006 | Ota | |
| 2007/0130353 A1 | 6/2007 | Chou et al. | |

FOREIGN PATENT DOCUMENTS

| | | |
|---|---|---|
| WO | WO 2006/035318 | 4/2006 |

OTHER PUBLICATIONS

Wei, Li, et al., "A New Selective Retransmitted ARQ System," Global Telecommunications Conference, 1993.. IEEEE, Nov. 29, 1993, New York, NY, USA, XP010109955, pp. 1815-1821.

Benelli, Giuliano, et al., "New Modified Stop-and-Wait ARQ Protocols for Mobile Communications," Wireless Personal Communications, Springer, Dordrecht, NL, vol. 1, No. 2, Jan. 1, 1994, pp. 117-126, XP000511623.

Medeiros, J.C., et al., "Evaluation of a Stop and Wait Scheme with HF Data," Proceedings of the Gobal Telecommunications Conference and Exhibition, New York, IEEE, XP000794852, vol. 3, Dec. 1, 1985, pp. 1029-1033.

International Search Report for PCT/EP2008/051833 dated Jul. 9, 2008.

* cited by examiner

CONGESTION REDUCING RELIABLE TRANSPORT PACKET RETRY ENGINE

CROSS REFERENCE TO RELATED APPLICATION

This application is related to the application entitled "RELIABLE NETWORK PACKET DISPATCHER WITH INTERLEAVING MULTI-PORT CIRCULAR RETRY QUEUE", Ser. No. 11/686,408, which was filed on the same day as the present application and commonly assigned herewith to International Business Machines Corporation. This related application is incorporated herein by reference in its entirety.

FIELD OF THE INVENTION

The present invention generally relates to the field of transmitting data over a network, and more particularly relates to managing the dispatch of packets across a network using a reliable transport protocol.

BACKGROUND OF THE INVENTION

Reliable transport protocols are used in networking systems to ensure data is correctly received when errors in the transmission occur. In general, reliable transport protocols assign sequential sequence numbers to packets when the packets are first transmitted. When the packets are received at the destination (either at the next hop, or at their ultimate destination), the receiver transmits an acknowledgement packet back to the originator indicating which sequence number was received. Packets that are not acknowledged are typically re-queued and retransmitted by the originator after a predefined timeout duration occurs. However, in conventional reliable transport systems, when a node detects a timeout (i.e., that an acknowledgement has not been received), it resends all the packets it has queued up for that node. This has the disadvantage of flooding the network with many packets. If the communications difficulties that prevent successful transmission to the endpoint are not resolved, all of the packets will be discarded. The consumption of communications resources by the retransmission of all unsuccessfully communicated packets can adversely affect the operation of unrelated nodes in the network that are not experiencing difficulties since the availability of the shared communications resources will be reduced.

Therefore a need exists to overcome the problems with the prior art as discussed above.

SUMMARY OF THE INVENTION

Briefly, in accordance with the present invention, disclosed are a method, information processing system, computer readable medium, and network device for transmitting at least one packet across a network destined for reception by at least one network endpoint. The method comprises processing sequentially a plurality of packets from a queue to be sent to at least one network endpoint. At least a first packet from the plurality of packets is transmitted to the at least one network endpoint. The at least first packet transmitted to the at least one network endpoint is determined to not have been acknowledged. A first retry packet associated with the at least first packet is transmitted to the at least one network endpoint in response to the determining that the at least first packet has not been acknowledged by the at least one network endpoint. Transmission of packets other than the first retry packet to the at least one network endpoint is suspended. The first retry packet is determined to have been acknowledged by the at least one network endpoint. Transmission of remaining packets in the plurality of packets to the at least one network endpoint is resumed in response to the determining that the first retry packet has been acknowledged.

In another embodiment, an information processing system for transmitting at least one packet across a network destined for reception by at least one network endpoint is disclosed. The information processing comprises a memory and a processor that is communicatively coupled to the memory. The information processing system also includes a queue that is adapted to storing a plurality of packets to be sent to a network endpoint. A packet manager is communicatively to the memory and the processor. The packet manager is adapted to processing sequentially a plurality of packets from a queue to be sent to at least one network endpoint. At least a first packet from the plurality of packets is transmitted to the at least one network endpoint. The at least first packet transmitted to the at least one network endpoint is determined to not have been acknowledged. A first retry packet associated with the at least first packet is transmitted to the at least one network endpoint in response to the determining that the at least first packet has not been acknowledged by the at least one network endpoint. Transmission of packets other than the first retry packet to the at least one network endpoint is suspended. The first retry packet is determined to have been acknowledged by the at least one network endpoint. Transmission of remaining packets in the plurality of packets to the at least one network endpoint is resumed in response to the determining that the first retry packet has been acknowledged.

In yet another embodiment, a computer readable medium for transmitting at least one packet across a network destined for reception by at least one network endpoint is disclosed. The computer readable medium comprises instructions for processing sequentially a plurality of packets from a queue to be sent to at least one network endpoint. At least a first packet from the plurality of packets is transmitted to the at least one network endpoint. The at least first packet transmitted to the at least one network endpoint is determined to not have been acknowledged. A first retry packet associated with the at least first packet is transmitted to the at least one network endpoint in response to the determining that the at least first packet has not been acknowledged by the at least one network endpoint. Transmission of packets other than the first retry packet to the at least one network endpoint is suspended. The first retry packet is determined to have been acknowledged by the at least one network endpoint. Transmission of remaining packets in the plurality of packets to the at least one network endpoint is resumed in response to the determining that the first retry packet has been acknowledged.

In another embodiment a network device is disclosed. The network device comprises a memory and a processor that is communicatively coupled to the memory. The network device also includes at least one network adapter that is communicatively coupled to the memory and the processor. A queue is adapted to storing a plurality of packets to be sent to at least network endpoint. A packet manager that is communicatively to the memory, the queue, and the processor is adapted to for processing sequentially a plurality of packets from a queue to be sent to at least one network endpoint. At least a first packet from the plurality of packets is transmitted to the at least one network endpoint. The at least first packet transmitted to the at least one network endpoint is determined to not have been acknowledged. A first retry packet associated with the at least first packet is transmitted to the at least one network endpoint in response to the determining that the at least first packet has not been acknowledged by the at least one network endpoint. Transmission of packets other than the first retry packet to the at least one network endpoint is suspended. The first retry packet is determined to have been acknowledged by the at least one network endpoint. Transmission of remaining packets in the plurality of packets to the at least one network endpoint is resumed in response to the determining that the first retry packet has been acknowledged.

One advantage of the present invention is a packet retransmission module is provided that retransmits packets across a network in such a way that congestion in the network due to retransmission of unacknowledged packets is reduced. For example, the packet retransmission module limits the retransmission of missing packets between specific endpoints to only the first packet failing to be acknowledged and then waiting for a response to that single packet. Only after that first unacknowledged packet is acknowledged does the retransmission module proceed to send all other outstanding packets until it detects that a packet that has not been transmitted yet is to be sent, at which time the retransmission module reverts back to its normal transmission mechanism (i.e., transmitting without waiting for an immediate acknowledgement until the limit of number of outstanding packets is reached). Embodiments of the present invention prevent the flooding of the network with unacknowledged packets in the case of an acknowledgement timeout and packets are retransmitted in the original order that they were received.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Exemplary Network

Figure 1:
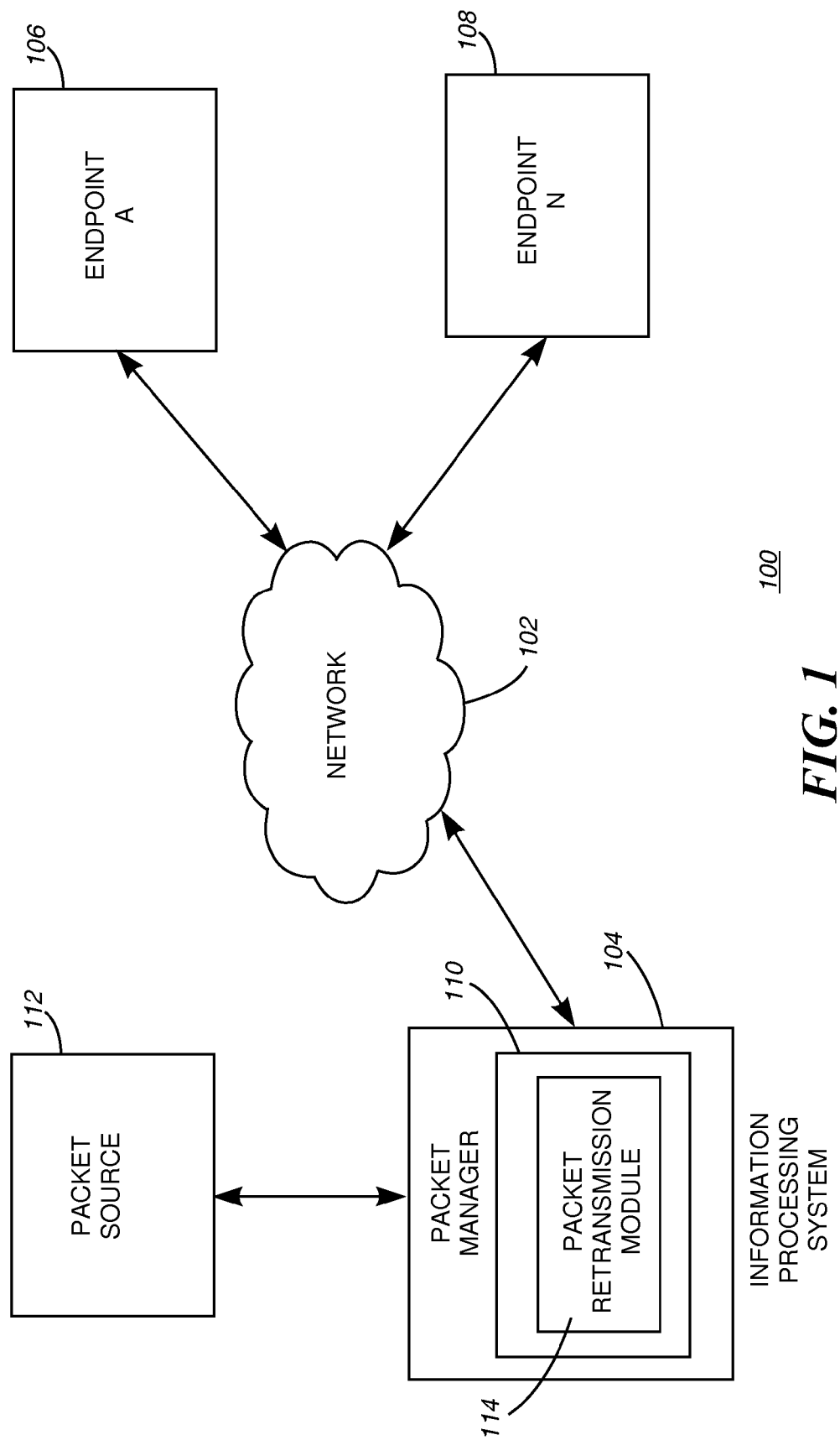
FIG. 1 is a block diagram illustrating an exemplary network for transmitting packets according to an embodiment of the present invention.

According to an embodiment of the present invention, as shown in FIG. 1, an exemplary network 100 is shown. FIG. 1 shows a network 102 communicatively coupled to network nodes such as information processing system 104, endpoint A 106, and endpoint N 108. Each of the endpoints 106, 108 can be an information processing system, router, gateway, network hub, and the like. In other words, the endpoints 106, 108 are any network component destined to receive a transmitted packet. In one embodiment, the endpoints 106, 108 are uncorrelated, i.e., they have different sequence numbers between them.

The information processing system 104, in one embodiment, includes a packet manager 110. The packet manager 110 receives packets for transmission to end points 106, 108 from a packet source 112 and reliably transmits the packets to the endpoints 106, 108. The packet manager 110 includes, among other things, a packet retransmission module 114 for retransmitting packets to the endpoints 106, 108. The packet source 112, in one embodiment, can be one or more other information processing system communicatively coupled to the packet manager 110. The packet source 112 can also be one or more processes that reside within the information processing system 104. For example, the packet source 112, in one embodiment, is an application that generates packets to be sent to the endpoints 106, 108.

The packet manager 110 uses one or more reliable transport protocols when transmitting a packet to an endpoint 106, 108. Traditionally packets are assigned incrementing sequence numbers when they are first transmitted. When received at the destination (either next hop, or ultimate destination based upon the requirements of various communications systems), the receiver transmits an acknowledgement packet back to the originator indicating which sequence number was received. Reliable transports may alternatively coalesce acknowledgment packets. Coalescing acknowledgement packets includes receiving several packets and sending one acknowledgment that corresponds to the last packet. In systems that transmit via reliable transport the transmitting node maintains copies of all of the unacknowledged packets up to and including the packet corresponding to the sequence number provided in the last acknowledgment packet that was received. Packets that are not acknowledged are typically retransmitted by the transmitting node after a predefined timeout duration occurs. Other remediation is possible including retransmitting to an alternate port or route, or discarding the packets.

The reliable protocol may or may not support the use of multilane or multiple contextual sequence numbers. Multilane and multiple contextual sequence number include the case where separate sets of sequence numbers are used to concurrently maintain several streams of unrelated communication. In this mode, the different streams (sometimes referred to as "nodes") have no relationship between them. The present invention supports this mode, and is not limited to the number of nodes, maximum number of outstanding packets, or size of the sequence number.

As compared to conventional re-transmission schemes where all packets are resent to an endpoint 106, 108, the packet retransmission module 114 of some embodiments limits the retransmission of missing packets to only the first packet that has not received an acknowledgement. After transmission of a packet, the packet retransmission module 114 waits for a response from the endpoint 106, 108 acknowledging successful reception of the packet. Unacknowledged transmitted packets are accumulated by the transmitter until previously timed out packets have been acknowledged. For example, as discussed in greater detail in the commonly owned and co-pending application entitled "RELIABLE NETWORK PACKET DISPATCHER WITH INTERLEAVING MULTI-PORT CIRCULAR RETRY QUEUE", Ser. No. 11/686,408, unacknowledged transmitted packets are accumulated in a retry queue (not shown). The retry queue (not shown) is for packets that require re-transmission; a holding buffer for packets inhibited from original transmission due to network back-pressure; and/or a staging buffer for packets that are pending disposal from the information processing system 104 due to successful transmission or unrecoverable error. In one embodiment, the re-transmission of packets, the holding of packets, and the requeing of packets can occur simultaneously. The retry queue can be a shared circular multi-port FIFO buffer.

After a packet that is being retransmitted, i.e., the first packet that did not receive a timely acknowledgement message from the receiver, has been acknowledged by the receiver, the packet retransmission module 114 proceeds to send out the outstanding, unacknowledged packets until it detects that the next packet to transmit is a packet that has not been transmitted. If a packet that has not been transmitted is detected as the next packet to transmit, the packet manager 110 reverts back to its normal transmission mechanism (i.e., transmitting without waiting for an immediate acknowledgement until the limit of number of outstanding packets is reached). The packet retransmission module 114 is discussed in greater detail below.

Packet Retransmission Module

Figure 2:
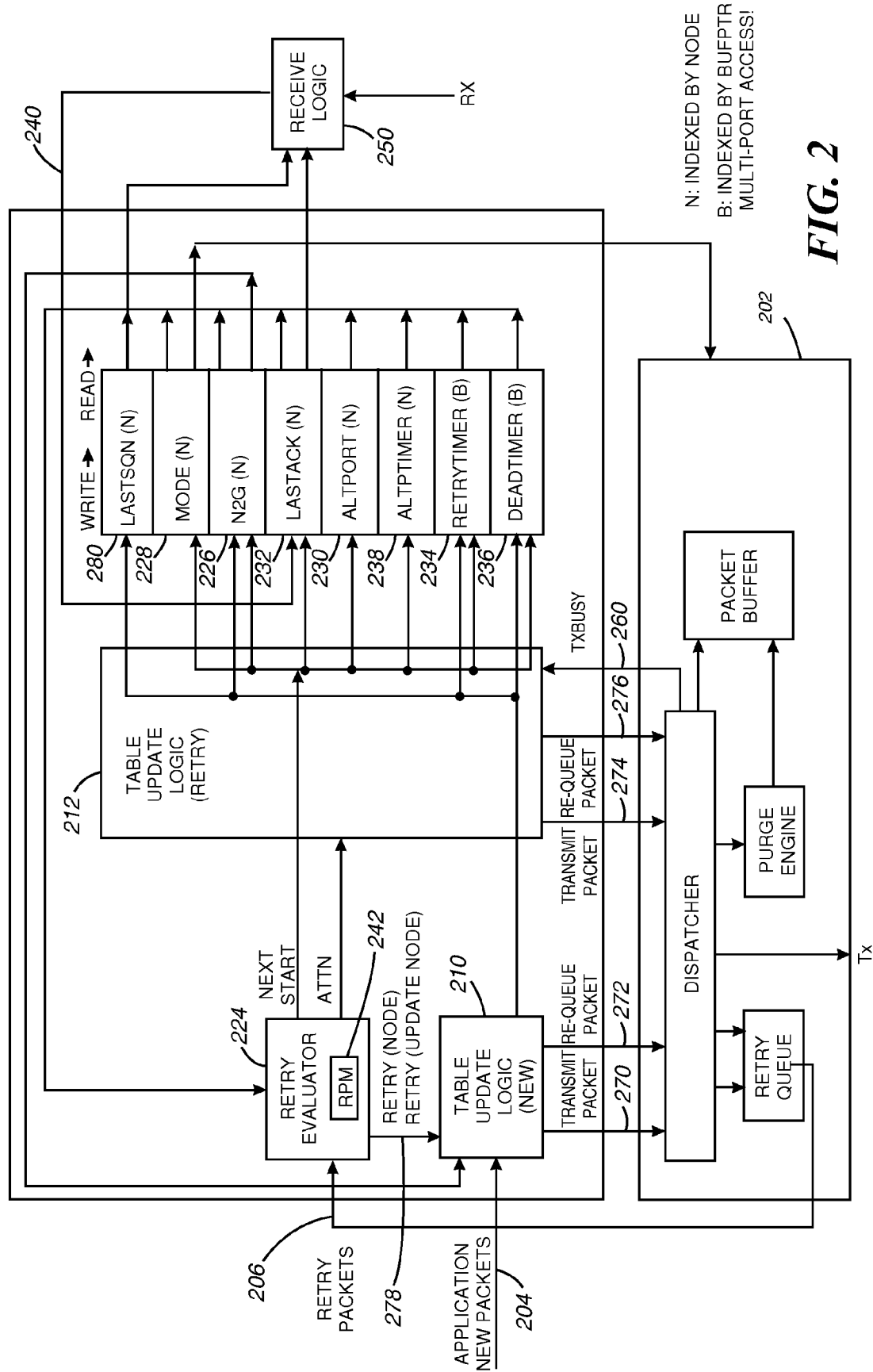
FIG. 2 a more detailed view of a packet retransmission module according to an embodiment of the present invention.

FIG. 2 is a block diagram showing a more detailed view of the packet retransmission module 114. FIG. 2 shows the packet retransmission module 114 as residing within the packet manager 110. In one embodiment, the packet retransmission module 114 is communicatively coupled to a packet dispatcher 202, which is discussed in greater detail in the commonly owned and co-pending application entitled "RELIABLE NETWORK PACKET DISPATCHER WITH INTERLEAVING MULTI-PORT CIRCULAR RETRY QUEUE", Ser. No. 11/686,408, which is hereby incorporated herein by reference in its entirety. Therefore, the components shown residing within the packet dispatcher 202 are not discussed. In further embodiments of the present invention, components shown residing within the packet retransmission module 114 such as tables 240 can be separate from the packet retransmission module 114.

Packets 204, 206 can enter into the packet retransmission module 114 independently and optionally-concurrently via paths into the packet retransmission module 114. New packets 204 are from an application and have never been previously transmitted or are packets placed in a retry queue because they cannot be currently transmitted (ie, due to network backpressure, or a change of mode of operation of the node). One example of packets received by the packet manager is new packets 204 that are received from the packet source 112. In one embodiment, the packet manager 110 receives abbreviated packets as discussed in the commonly owned and co-pending application entitled "RELIABLE NETWORK PACKET DISPATCHER WITH INTERLEAVING MULTI-PORT CIRCULAR RETRY QUEUE", Ser. No. 11/686,408. For example, once a packet is received, a packet analyzer (not shown) analyzes the received packet to determine what data within the packet to extract. Based on this analysis, a data extractor (not shown) extracts data from the received packet that is used by the packet dispatcher 202 for determining an endpoint to transmit the packet to and which output port to send the packet to.

The extracted data that is sent to the packet dispatcher 202 is referred to as an "abbreviated packet". In other words, the packet sent to the packet dispatcher 202 is not the complete packet received by the packet abbreviator (not shown). Abbreviated packets only include information needed for the packet retransmission module 114 to determine receiving endpoints and a pointer to the remaining data contained in the packet is stored in a packet buffer to simplify the data handling of the packet manager 110. Another example of packets received by the packet manager 110 are retry packets 206 that are retrieved from a retry queue, which is a data storage memory used to store packets that cannot be transmitted right away or that are awaiting potential retransmission due to not being acknowledged by the receiver. Therefore, in one embodiment, retry packets 206 are packets that have been prevented from being transmitted previously and/or packets that have already been transmitted, but which are awaiting their acknowledgement timeout or packets for which an acknowledgement has not been received back from the receiving device Received packets 204, 206, in one embodiment, include information such as a node designation indicating what endpoint or context is destined to receive the packet, a sequence number associated with the packet, a buffer pointer, which points to the remainder of the packet as stored in the packet buffer, and the like. The packet in one embodiment of the present invention is stored in the packet buffer until it is acknowledged or discarded. In that embodiment, each transmitted packet is saved until an acknowledgement is received.

New packets 204 are evaluated by a new packet table update module 210. This module 210 determines how context tables 240 are to be updated in response to new packets that can be transmitted on the first pass and whether they need to be immediately transmitted or requeued. The retry packets 206 are evaluated by a retry packet evaluator 224 to determine how context tables 240 are to be updated and whether they need to be transmitted or requeued again. Information from the new packet table update module 210 and the retry evaluator 224 are processed by the table update logic 212 module along with packet transmit information (such as a transmitter busy signal 260) that determine what table entries are updated and convey to the packet dispatcher 202 what packet to transmit. The table update logic 212 decodes the node information from both the retry evaluator 224 and the table update logic 210 so that if they are operating on two different nodes, the respective tables for both nodes in 240 are updated simultaneously and concurrently. It also includes the logic for directly manipulating the RAM or registers as per the mechanism of the table that is, but not limited to, either as a timer that needs to be restarted; a sequence number that needs to be incremented; or just a direct write.

In more detail, if a new packet 204 is received by the packet retransmission module 114, the new packet table updater 210 determines the transmission mode associated with an endpoint destined to receive the packet. For example, the transmission mode can be "normal," "retry," "dead", or "recover." In a "normal" mode packets are transmitted without waiting for an immediate acknowledgement until the limit of number of outstanding packets is reached. In a "retry" mode, the retransmission of missing packets is limited to only the first previously transmitted packet that has not been acknowledged by the receiving node. In a "recover" mode, all outstanding packets (up until a non-transmitted packet is detected) are sent to the destination node after an acknowledgement associated with the previously unacknowledged and retransmitted packet is received from the receiving node.

If the transmission mode is "normal", the packet dispatcher 202 transmits the new packet 204 to its respective destination. Once the new packet 204 is transmitted, packet timers such as a retry timer and a dead timer are started. A retry timer is used by the packet retransmission module 114 to determine the maximum time to wait for an acknowledgement from the destination node and when to retry the transmission of a packet. A dead timer is used by the packet retransmission module 114 to determine when to stop retries of a packet that has not been acknowledged and to start error recovery processing for the packet transmission. If the transmission mode is "retry", new packets 204 received by the packet retransmission module 114 are sent into a retry queue. It should be noted that new packets and retry packets can be received simultaneously by the packet retransmission module 114.

The packet retransmission module 114 manages the retransmission of packets to endpoints 106, 108. The packet retransmission module 114 monitors the duration from when a packet is transmitted until when an acknowledgement is expected. The packet retransmission module 114 determines when to retry transmission of a packet, if the retransmission should use an alternate port or route to its destination, or if retransmission of a packet is to be terminated. The packet retransmission module 114 also determines if a retransmission was successful or not by determining that a packet has not been acknowledged by its destination node within a specified time and after a specified number of retransmission attempts.

The packet retransmission module 114 monitors retry packets from a retry queue to determine whether an acknowledgement has been received for a transmitted packet. If the retransmission module determines that a packet from a retry queue for any node has timed out based on a retry timer (e.g., an acknowledgment has not been received for the packet within a given time interval), the packet retransmission module 114 moves into a "retry" state and the packet dispatcher 202 retains the packet in the retry queue However, if the packet retransmission module 114 determines that a dead timer associated with the packet has expired, the node the packet belongs to is moved into the "dead" state. The packet dispatcher 202 uses this state information to determine the disposition of these packets.

As stated above, the packet retransmission module 114 is coupled to a set of tables 240 that are analyzed and updated for determining when to retransmit a packet. For example, FIG. 2 shows a "Next To Go" ("N2G") table 226, a "Mode" table 228, an "Alternate Port" ("AltPort") table 230, a "last acknowledged sequence number" ("LastAck") table 232, a "Retry Timer" table 234, a "Dead Timer" table 236, an "Alternate Route Timer" ("AltTimer") table 238, and a LastSQN table 280. It should be noted that these tables are listed as an example of one embodiment, and further embodiments of the present invention are able to utilize other data maintenance tables.

The N2G table 226 includes the sequence number of the next packet to be transmitted to a particular destination for each active data stream. For example, if node N has just been sent sequence number 7 for a particular data stream, N2G table 226 includes the entry 8 for this data stream. In one embodiment, the N2G table 226 is indexed by node number and is implemented via a register array.

The Mode table 228, in one embodiment, is indexed by node number and includes the mode of each indexed node. In one example, the Mode table 228 references four different modes for a particular node: Normal, Retry, Recovery, and Dead. The Retry mode indicates that a retry timer associated with a particular packet for a node has expired. The N2G number is reverted in order to resend a previously sent packet. While in this mode, only the N2G packet and no other packets are transmitted to this node. The Retry mode also allows for a packet to be retransmitted on an alternate port. Through the use of an additional node indexed timer, a further decision can be made as to whether to retransmit to the same port of try a different one. The Dead mode indicates that a dead timer has expired on a node. While in the dead mode, the packet retransmission module assumes that the other end of the link is no longer functioning and further transmissions are not attempted. The Recovery mode indicates that an Ack has been received from a node that has had a packet retransmitted to it. Remaining packets can be ordinally retransmitted until the packet retransmission module 114 identifies a packet that has not been previously transmitted. The Normal mode allows a packet to a node provided that the packet is in sequence.

The AltPort table 230 is also indexed by node number in one embodiment and indicates that a packet rerouting solution needs to be attempted to overcome a data communications error. For example, if after so many retransmission attempts an acknowledgement is not received the AltPort table 230 can indicate to the package retransmission module 114 that a new routing solution needs to be used.

The LastSqn table 280 is also indexed by node number in one embodiment and indicates the last sequence number assigned to a packet for a destination endpoint. A last sequence number entry into the LastSqn table 280 is created when the packet is first received and is otherwise persistent. The LastAck table 232 is also indexed by node number in one embodiment and indicates the sequence number of the last packet that was acknowledged by the destination node. This table is updated by the packet retransmission module 114 when an acknowledgment packet is received by receive logic 250. If the sequence number of a received acknowledgement is both greater than the value currently stored in the LastAck table 232 for a particular endpoint, and less than or equal to the value of the sequence number that was last assigned to the latest packet for this endpoint (LastSqn 280), the LastAck sequence number table 232 can be written to. Otherwise, the received acknowledgement packet is disregarded. Disregarding such a received acknowledgement message ensures that a bad sequence number is not written into the LastAck sequence number table 232, which would affect proper operation of a retry state machine used by the retransmission module 114 for determining when to retransmit a packet. The retry state machine is discussed in greater detail below.

The RetryTimer table 234 and the DeadTimer table 236 are similarly structured and are indexed by a buffer pointer in one embodiment. Some embodiments use a 2-bit timer per buffer pointer, and a "SYNC" pulse is provided to establish the frequency at which the timers are updated. In one embodiment, the RetryTimer table 234 and the DeadTimer table 236 reflect the state of the Retry and Dead Timers discussed above. The retransmission module 114 can analyze the RetryTimer table 234 and DeadTimer table 236 to determine when to retry transmission of a packet or when stop retransmissions of a packet and perform an error recovery operation. The AltTimer table 238, which is indexed by Node number and not buffer pointer, reflects the status of an alternate route timer and is used by the retransmission module 114 to determine when to use an alternate route for retransmitting a packet.

When a retry packet 206 is received by the packet manager 114, the retry evaluator 224 analyzes the retry packet 206 for communicating information associated with the retry packet 206 to the retry packet table updater 212. The retry evaluator 224 analyzes the set of tables 240 discussed above and a retry state machine 242 (discussed in greater detail below) with respect to the incoming retry packet 206 and its associated node to determine whether to retransmit the retry packet 206 and what state to move the node into.

For example, the set of tables 240 keeps track of timer states, current transmission modes associated with each node, last acknowledged transmitted packet from each node and data stream, and the like. If the retry evaluator 224 determines that a retry timer has been initialized for a packet and that a given response threshold has been exceeded, the retry evaluator can signal the retry packet table update module 212 to change the transmission mode associated with the node from "Normal" to "Retry". This prevents any new packets from being transmitted to that node.

While in Retry mode, when the packet retransmission module 114 receives a packet for retransmission from the retry queue that corresponds to the earliest packet missing an acknowledgement and the retry timer has timed out, the packet transmit module 202 is signaled to send that packet again and a packet timer (e.g., the retry timer) 234 restarted. No other packets to that node are transmitted at this point. However, packets can still be transmitted to other nodes that are not in the similar "retry" state even though one or more nodes are in the "retry" state. When that packet is subsequently received from a retry queue after the retry time expires again, that packet and only that packet is re-transmitted to that node.

If this cycle continues longer than a given interval (e.g., an alternate route timer exceeds a given threshold and indicates that an alternate communications route should be used to communicate data with that particular node), a retransmission with an optional routing change is sent to the packet transmit module 202. For example, the retry evaluator 224 determines from the AltTimer table 238 that a routing change is needed to the path specified by the entry in the AltPort table 230 for this data stream. The packet retransmission and restarting of the packet timer 234 for just that packet for that node is continued until the dead-timer for that data stream has exceeded a threshold. Once the dead-timer has exceeded its threshold, the retransmission module 114 changes the mode of that node is to "Dead" and the retransmission module 114 signals the packet transmission module 214 to exercise a recovery protocol(s) for that network. For example, all packets to that node are typically deleted from the retry queue.

If however, during the retry period an acknowledgment is received that corresponds to any of the outstanding packets for that node, the mode of that node is changed from "Retry" to "Recovery". The packet monitor 114 monitors incoming retry packets 206 for the packet that corresponds to the N2G sequence number packet. Once detected, the packet monitor 220 signals the packet transmission module 202 to resend that packet and restarts the corresponding retry timer.

The "recovery" mode continues with the packet monitor 220 monitoring all packets received from the retry queue and determining if the packet(s) should be retransmitted. While in the recovery mode, retry timers 234 are ignored until the retransmission module 114 detects a packet 204, 206 that has never been sent. This is determined, in this embodiment, by noticing that a retry timer associated with a packet has not been initialized. This can happen, for example when new packets arrive while the node to which they are to be sent has a mode of "retry", and that packet is sent directly to the retry queue. Since new packets are not sent in the "retry" mode, the timer for that packet has not been set. When a packet that has not been sent is encountered, the node is returned back to its "Normal" mode and the transmitter sends new packets.

As can be seen, the retransmission module 114 of the present invention only transmits one packet for a node in the "retry" mode and the acknowledgement for that packet is used to test whether the end point is working again and when the mode of that node should change to reflect that communications has been reestablished. Once an acknowledgement for that one packet has been received, only then is the more rapid retransmission of the outstanding packets attempted. The retransmission of the outstanding packets to the troubled node is intermixed with packet transmission to other nodes, perhaps not experiencing difficulties or perhaps recovering in parallel. The advantages of this algorithm over prior art approaches are that it does not flood the network with unacknowledged packets when it detects a timeout, and it insures that packets are resent in the original order that they were received.

State Machine Diagram For Determining When To Retransmit A Packet

Figure 3:
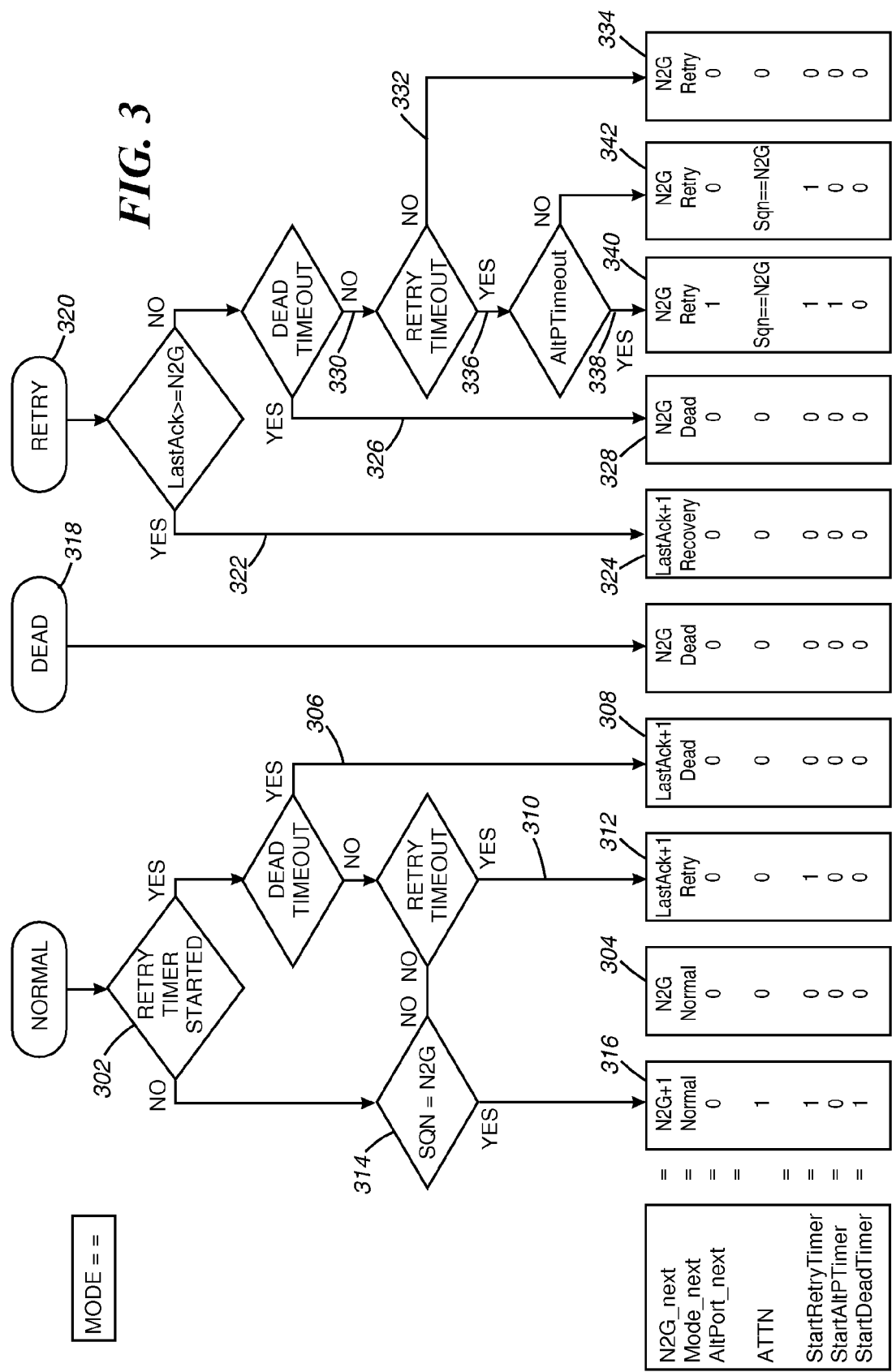
FIG. 3 is a detailed view of a retry state machine according to an embodiment of the present invention.

FIG. 3 is a diagram illustrating an exemplary state machine 300 used by the packet retransmission module 114 for determining when to retransmit a packet. If the Mode for the node of concern is "Normal", then the following subsequent decisions are made. If the retry timer has been started (302), but neither the Retry or Dead timers have expired, then there is nothing to do, the current packet is not transmitted (304). Determining whether a timer has or has not been started is accomplished by checking that the timer value (state) for that buffer pointer is not in an Idle state. If the Dead Timer has expired (306), the Mode is changed to "Dead" and N2G remains at the value of LASTACK+1 (308), although this is just a formality, as this node does not have any packets transmitted to it once in this state.

If the Dead Timer has not expired, but the Retry Timer has expired (310), the Mode is set to "RETRY" and the N2G is similarly set to LASTACK+1 (312). This represents the earliest packet that has not been acknowledged and is the packet that is to be retransmitted. Note that this in itself does not cause the retransmission, the node is merely placed into the retry state. If the retry timer has not been started for this packet on this node, then the SQN of the packet is checked (314) to see if it is equal to N2G; i.e., is it in sequence? If the SQN of the packet is in sequence, then this packet is enabled for transmission and the N2G value is incremented (316). This action indicates that a packet was previously deferred for transmission has been found. The Retry and Dead timers are started when this packet is transmitted via the signals StartRetryTimer and StartDeadTimer.

If it was not in sequence, this entry is requeued and no action is taken for this packet (304). If the Mode for this node is "Dead" (318) the entry is requeued and nothing further is done for this node. If the Mode for this node is "Retry" (320), then the following subsequent decisions are made. If the LastAck SQN is greater or equal to the N2G SQN for this node (322), this indicates that an acknowledgement has been seen for this node that is greater than the value of the sequence number that is currently being retransmitted for this node; i.e., there was a valid response from the other end of the link. If so, reset the N2G to the next ordinal sequence number (LastAck+1) and update the mode to "RECOVERY" (324). If the LastAck SQN is not greater or equal to the N2G SQN for this node, then the timers are checked. If the Dead Timer has expired for this node (326), update the mode to "DEAD" (328). If the Dead Timer has not expired (330), but neither has the Retry Timer (332), then there is nothing to do and the packet is requeued (334).

If the retry timer has expired (336) it indicates that this packet needs to be retransmitted and the mode remains unchanged. However the Retry Timer is restarted by asserting StartRetryTimer. An optional check for the AltPort Timer (338) can be done at this time. If this is the first time the packet is being retransmitted, the alt-port timer is not running, and it too is started via the signal StartAltPTimer. If it was not the first time the packet is being retransmitted and the AltPort Timer is observed also being expired, AltPort_Next (342) is asserted to indicate that the transmitting logic needs to update its routing tables (340).

It should be noted that when making the transition from the Normal State to the Retry State, the retry timer was not restarted. This insures that a retransmit is scheduled the first time the Retry State Machine processes this packet again. The ATTN signal is asserted when the sequence number of the packet being retried is the N2G SQN. Note that while in this mode, only this packet is transmitted once every time the retry timer expires.

Figure 4:
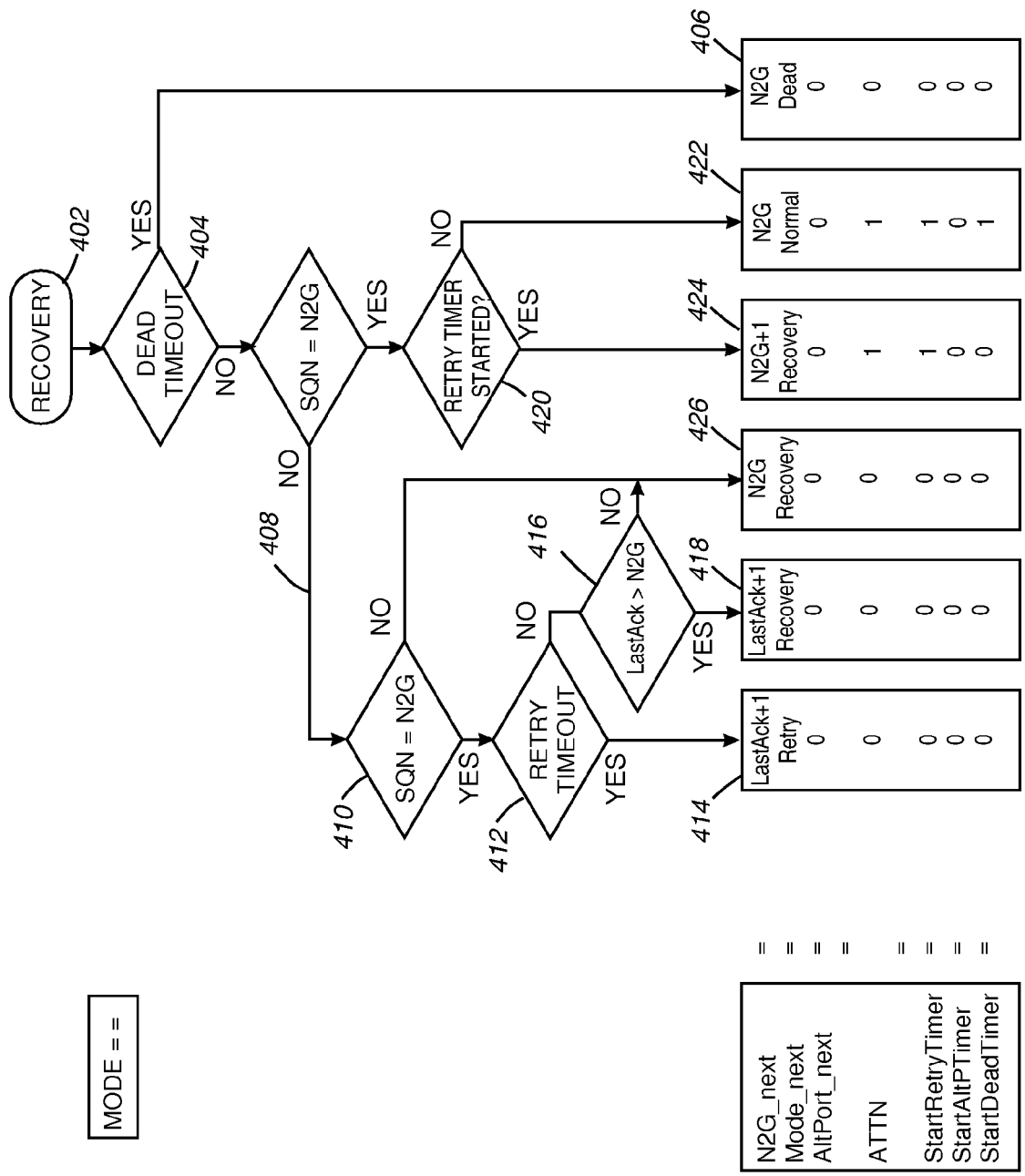
FIG. 4 is a continuation of the retry state machine of FIG. 3 according to an embodiment of the present invention.

FIG. 4 is a continuation of the state diagram of FIG. 3. If the Mode for this node is "Recovery" (402) then the following subsequent decisions are made. If the Dead Timer has expired for this node (404), update the mode to "DEAD" (406). If the Sequence number of the packet is not equal to N2G (408), i.e., it is not the next in sequence, it is requeued and not enabled for retransmission; the sequence number is then checked to see if it is less than N2G (410). In other words, has this packet been seen a second time before all the other outstanding packets have been retransmitted? If so, the retry timer is checked to see if it has expired again (412). If so, the N2G_next is set and the Mode is set back to "RETRY" (414). Otherwise, value of LastAck Sequence number from the Receive is checked to see if it is larger than the N2G (416). If so, N2G_next is set to this value +1 and the recovery mode continues with this sequence number (418). This represents additional ACK packets being received since the last time this node was evaluated. Updating the value of N2G while waiting for the correct packet helps prevent packets from being sent that is ultimately rejected as out of sequence by the other endpoint. Otherwise, there is no change (426). Note that retry timeout check is optional. Another embodiment of the circuit is to ignore that and just continue with the "NO" branch of the state machine.

If however, the Sequence number is equal to N2G an additional check of the retry timer (420) is made to see if it was already started. If the timer has not been started, this indicates that the current packet has never been transmitted previously. This also implies that the node has retransmitted all previously unacknowledged packets and it needs to go back to the "NORMAL" mode 422. Otherwise, it remains in the recovery mode asserting ATTN whenever the sequence number matches the N2G value as well as indicating the retry timer needs to be started again (424). On movement to the NORMAL mode, the Dead timer is started (since this packet had never been transmitted in the first place, its dead timer had not yet been started. The dead timer is not restarted when retransmits occur; only when the packet is first transmitted). As per FIG. 2, the results of these calculations are presented to the retry packet table update module 212 N2G_Next, Mode_Next, AltPort_Next which indicate the next state transitions for N2G, Mode, AltPort and the timer start pulses, StartAltTimer, StartRetryTimer, StartDeadTimer.

Exemplary Information Processing System

Figure 5:
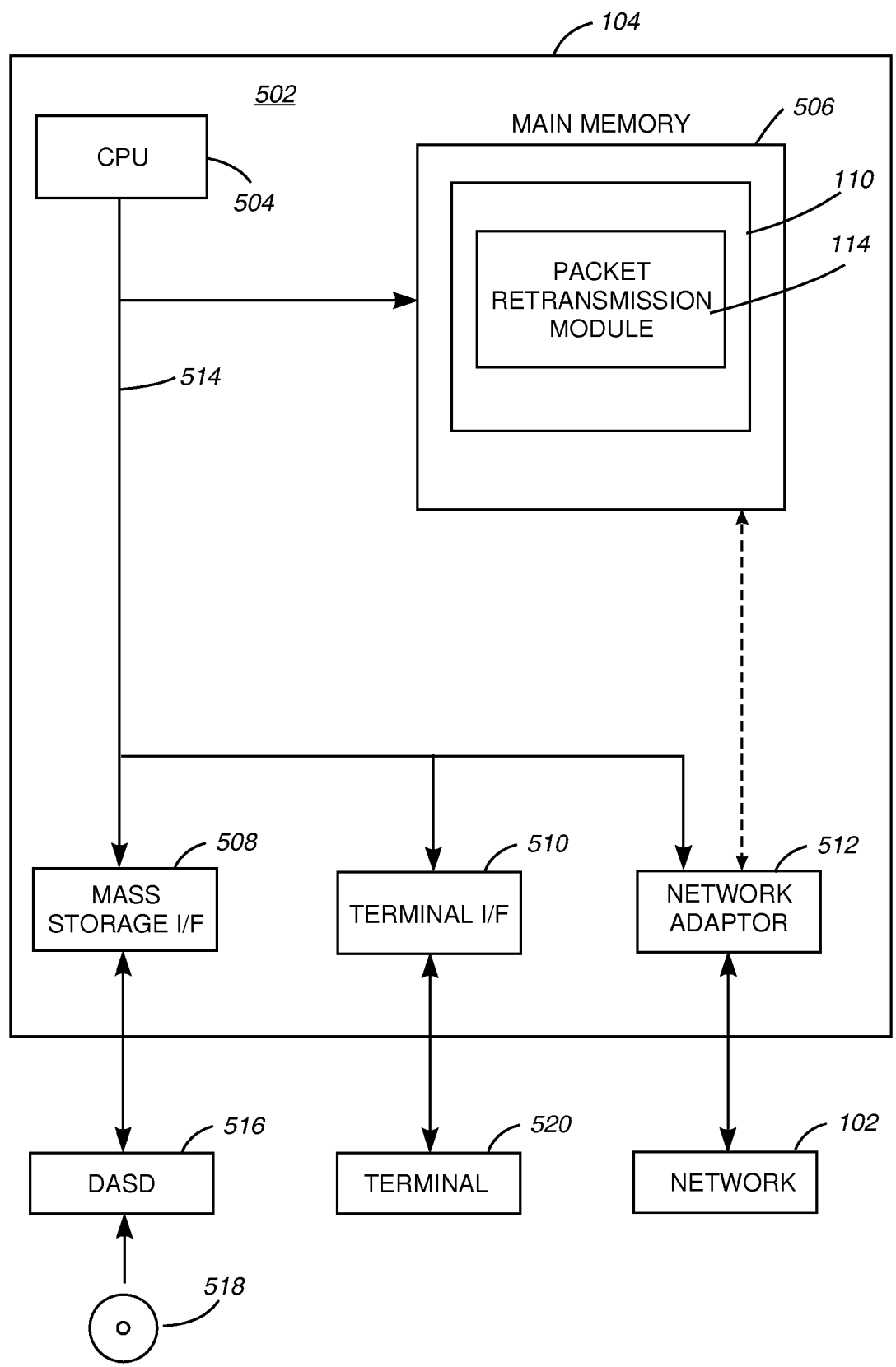
FIG. 5 is a detailed view of the information processing system of FIG. 1 according to an embodiment of the present invention.

FIG. 5 is a block diagram illustrating a more detailed view of the information processing system 104 of FIG. 1. The information processing system 104 is based upon a suitably configured processing system adapted to implement the exemplary embodiment of the present invention. Any suitably configured processing system is similarly able to be used as the information processing system 104 by embodiments of the present invention, for example, a personal computer, workstation, or the like.

The information processing system 104 includes a computer 502. The computer 502 has a processor 504 that is communicatively connected to a main memory 506 (e.g., volatile memory), mass storage interface 508, a terminal interface 510, and network adapter hardware 512. A system bus 514 interconnects these system components. The mass storage interface 508 is used to connect mass storage devices, such as data storage device 516 to the information processing system 104. One specific type of data storage device is a computer readable medium such as a CD drive, which may be used to store data to and read data from a CD 518 or DVD or floppy diskette (not shown). Another type of data storage device is a data storage device configured to support, for example, fixed disk type file system operations.

The main memory 506, in one embodiment, includes the packet manager 110, as discussed above the packet manager includes the packet retransmission module 114. The packet retransmission module 114 in one embodiment can reside within the packet dispatcher 202 or separate from the packet dispatcher 202. The components illustrated and described for the packet retransmission module 114 shown in FIG. 2 are not repeated in FIG. 5 for simplicity. In one embodiment, the information processing system 104 utilizes conventional virtual addressing mechanisms to allow programs to behave as if they have access to a large, single storage entity, referred to herein as a computer system memory, instead of access to multiple, smaller storage entities such as the main memory 506 and data storage device 516. Note that the term "computer system memory" is used herein to generically refer to the entire virtual memory of the information processing system 104

Although only one CPU 504 is illustrated for computer 502, computer systems with multiple CPUs can be used equally effectively. Embodiments of the present invention further incorporate interfaces that each includes separate, fully programmed microprocessors that are used to off-load processing from the CPU 504. Terminal interface 510 is used to directly connect one or more terminals 520 to computer 502 to provide a user interface to the computer 502. These terminals 520, which are able to be non-intelligent or fully programmable workstations, are used to allow system administrators and users to communicate with the information processing system 104. The terminal 520 is also able to comprise a user interface and peripheral devices that are connected to computer 502 and controlled by terminal interface hardware included in the terminal I/F 510 that includes video adapters and interfaces for keyboards, pointing devices, and the like.

An operating system (not shown), according to an embodiment, can be included in the main memory 506 and is a suitable multitasking operating system such as the Linux, UNIX, Windows XP, and Windows Server operating system. Embodiments of the present invention are able to use any other suitable operating system, or kernel, or other suitable control software. Some embodiments of the present invention utilize architectures, such as an object oriented framework mechanism, that allows instructions of the components of operating system (not shown) to be executed on any processor located within the client. The network adapter hardware 512 is used to provide an interface to the network 102. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk, CD-ROM 518, or other form of recordable media, or via any type of electronic transmission mechanism.

Exemplary Process for Retransmitting a Packet

Figure 6:
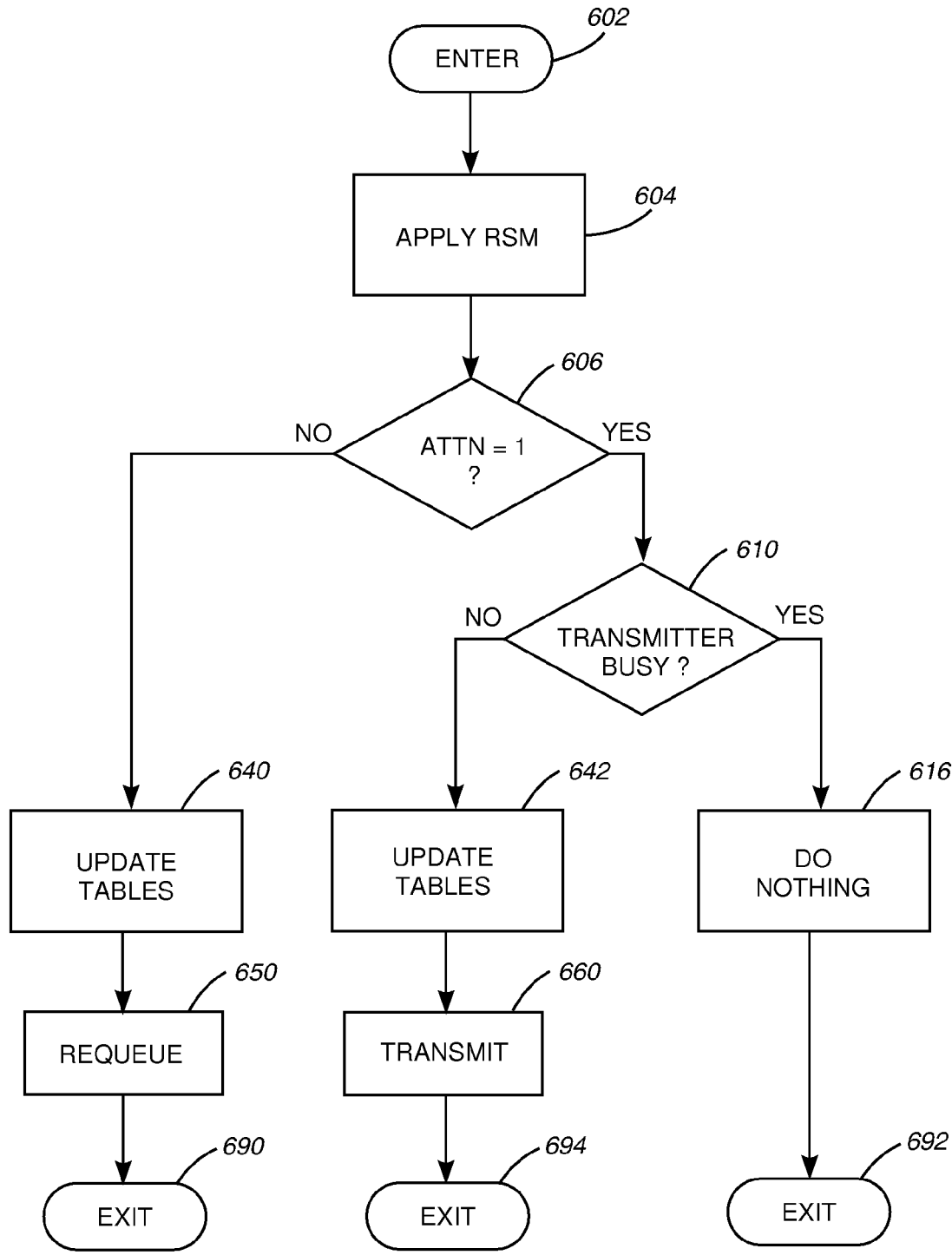
FIG. 6 is an operational flow diagram illustrating an exemplary process for processing a newly received packet according to an embodiment of the present invention.

FIG. 6 is an operational flow diagram illustrating an exemplary process for processing retransmitted packets. In this embodiment, retry packets come from a retry queue located in the packet dispatcher 202. The packets may come in any order to any nodes in an indeterminant frequency, and as discussed above, "previously" can even represent packets that were requeued without having been actually transmitted. The process begins at step 602 with it's entry to the Retry Evaluator 224. The packet is represented by the Node, Sequence number, and BufPtr. The process of the retry state machine 242, at step 604, is applied yielding results for the N2G_Next, Mode_Next, AltPort_Next, ATTN, StartRetryTimer, StartAltPTimer, and StartDeadTimer calculations. The value of the ATTN is then examined at step 606. If the result of the value is negative, this indicates that the present candidate packet is not transmittable and the following actions are taken.

First, at step 640, the Table update logic 212 is enabled to update the value of the tables 240 as per the previous calculation. The packet dispatcher 202, at step 650, is signaled to requeue the packet 276. The process then ends for this packet at step 690 and starts up again for the next packet. If however, the ATTN signal is positive at step 606, the table update logic 212, at step 610, examines the state of the transmitter to see if it is busy or not. If the transmitter signals busy 260, then, at step 616, nothing is done. The process ends for this packet at step 692 and restarts again presumably with the same packet since the packet dispatcher 202 was not signaled to do anything.

If the result of the determination at step 610 yields that the transmitter is not busy then the table update logic 212 is enabled, at step 642, to update the values of the tables 240 as per the previous calculation. The packet dispatcher 202, at step 660, is signaled to transmit the packet 274. The process ends for this packet at step 694 and restarts for the next packet.

Exemplary Process for Processing a Newly Received Packet

Figure 7:
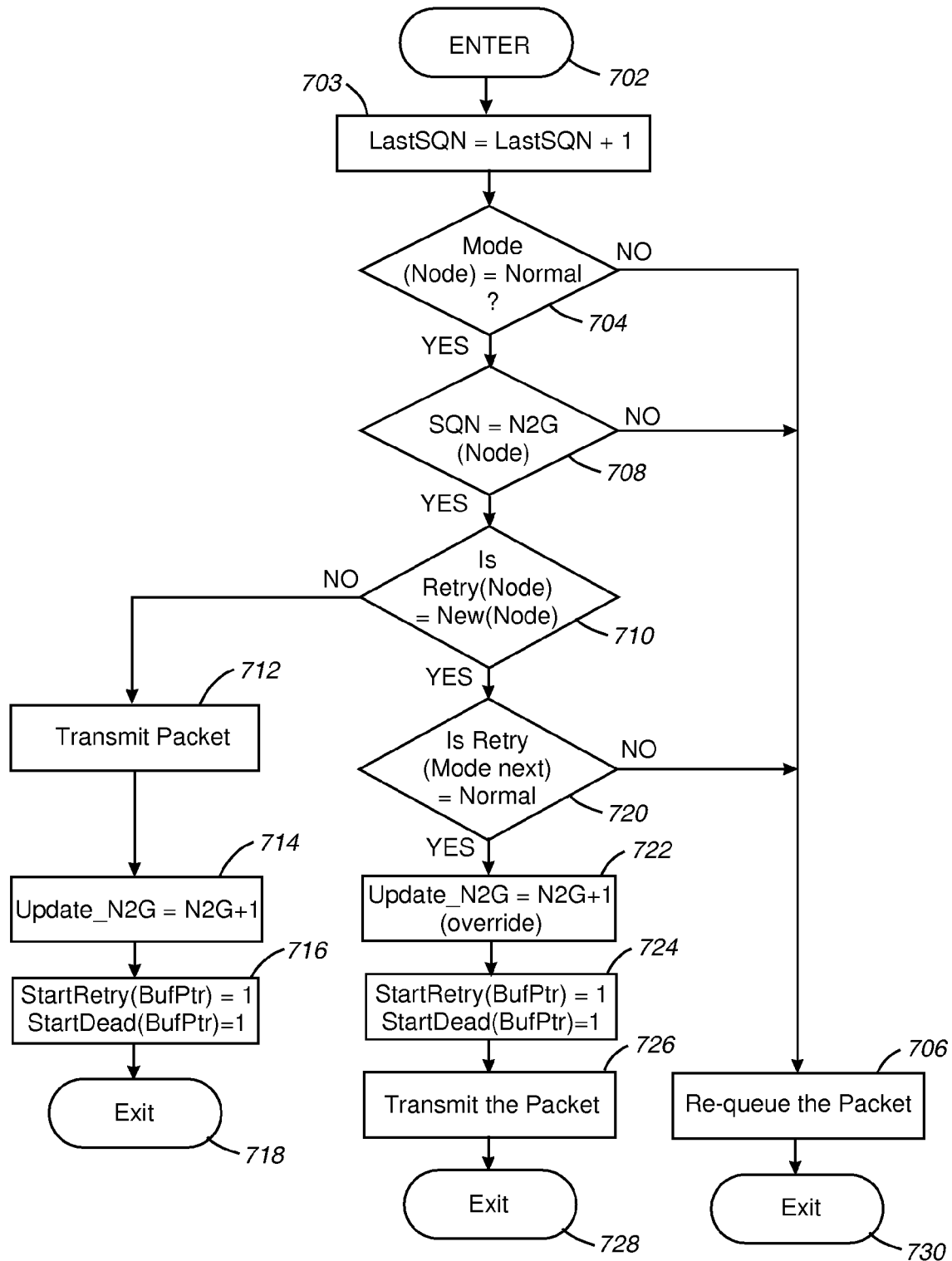
FIG. 7 is an operational flow diagram illustrating an exemplary process for processing a newly received packet according to an embodiment of the present invention.

FIG. 7 is an operational flow chart illustrating an exemplary process followed by the table update logic 210 for processing a newly received packet 204 identified by a node id, assigned sequence number, and buffer pointer. The operational flow diagram of FIG. 7 begins at step 702 and flows directly to step 703. Upon arrival of a new packet, a new sequence number, at step 703, is assigned to the packet and the value is incremented. The table update logic 210, at step 704, determines if the mode of node associated with the incoming packet is Normal. If the result of this determination is negative, the packet may not be transmitted and the table update logic 210 at step 706, requeues the packet. The control flow exits at step 730. If the result of this determination is positive, the table update logic 210, at step 708, determines if the SQN of the packet for that node equals the N2G as is evident by its SQN being equal to the N2G SQN for that node. If the result of this determination is negative, that packet also may not be transmitted and the packet is requeued (step 706).

If the result of this determination is positive, the node of the new packet is compared to the node that Retry Evaluator 224 is working on at step 710. If they are not the same node, this indicates that the new packet table update module 210 and the retry packet table update logic 212 are not attempting to alter the tables for the same node or buffer pointer and both can proceed independently. The new packet, at step 712, can be transmitted and the N2G value for that node, at step 714, is advanced to N2G+1. Furthermore, since this is the first time this packet is being transmitted, both the RetryTimer and DeadTimer, at step 716, are started. The control flow then exits at step 718.

If the new packet and the packet the Retry Evaluator 224 are both processing different packets from the same node at step 710, the packet retransmission module 114, at step 720, determines if Retry(next_Mode)=Normal. If this determination is negative, i.e., the Retry State Machine 242 has determined that the Mode is to be changed from the Normal Mode (as evident from the "mode_next" signal) the new packet must not be transmitted and is requeued at step 706. The Retry State Machine subsequently handles this packet when it comes back in from the retry queue. If however, the Retry State Machine 242 is not attempting to change out of the "NORMAL" mode, then this packet can be transmitted at step 726, but the retry packet table update module 212 yields control, at step 722, of the N2G table entry of that node to the new packet table update module 210. The Retry and Dead Timers, at step 724, are also started for the buffer pointer of this new packet. The control flow then exits at step 728.

Exemplary Flow for Timer Logic

Figure 8:
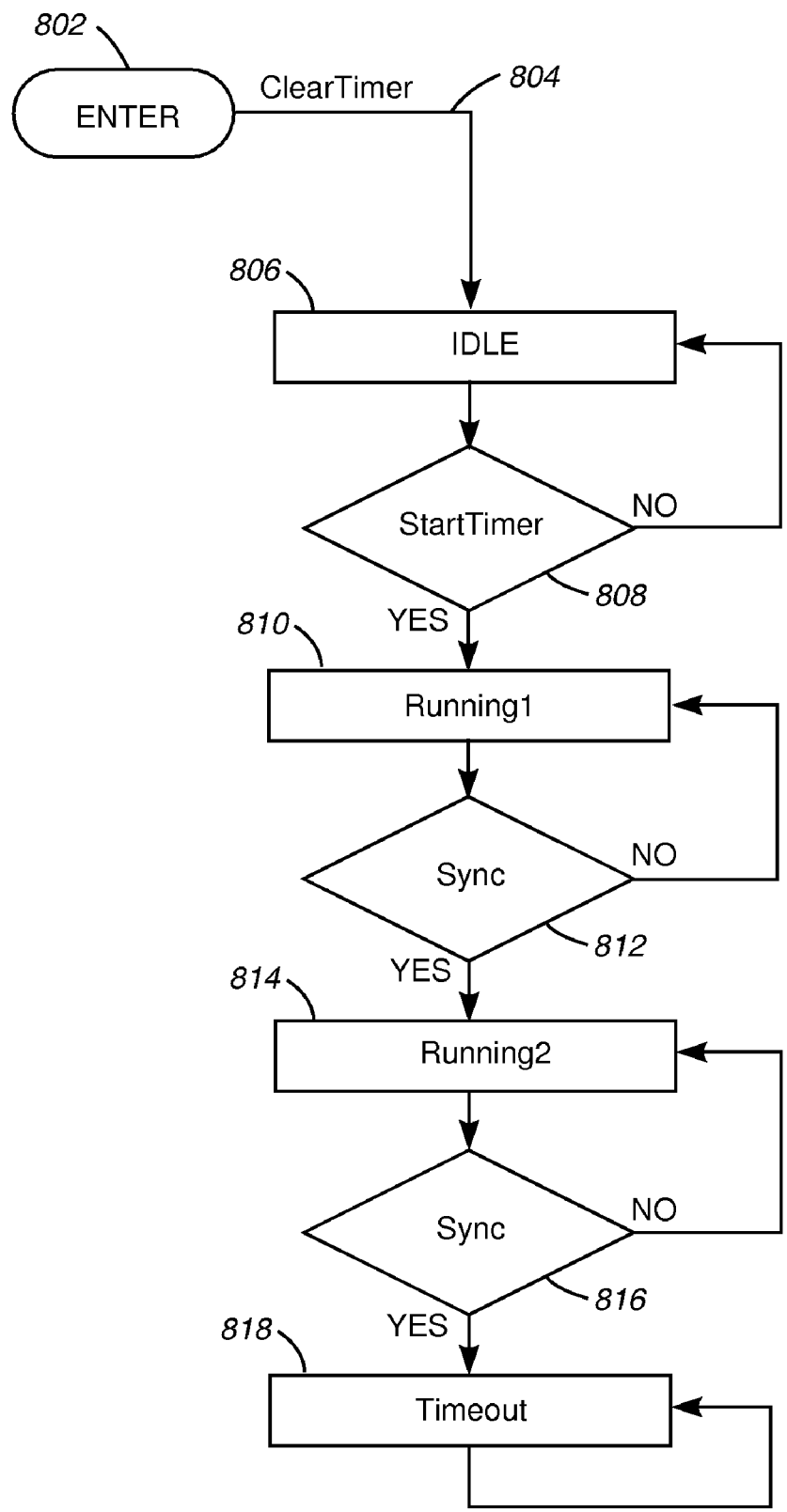
FIG. 8 is an operational flow diagram illustrating an exemplary process for maintaining a timer according to an embodiment of the present invention.

FIG. 8 is an operational flow diagram illustrating an exemplary flow for timer logic according to one embodiment of the present invention. The operational flow diagram of FIG. 8 begins at step 802 and flows directly to step 804. The current timer, at step 804, is cleared. The timer, at step 806, is idle. The packet manager 110, at step 808, determines if the timer needs to be started. If the result of this determination is negative, the timer remains idle. If the result of this determination is positive, the timer, at step 810, is started. The packet manager 110, at step 812, determines if the timer is synchronized. If the result of this determination is negative, the control flows back to step 810. If the result of this determination is positive, the timer, at step 814, continues to run. The packet manager 110, at step 816, determines if the timer is synchronized. If the result of this determination is negative, the timer continues to run at step 814. If the result of this determination is positive, the timer is synchronized and timeouts at step 818.

Figure 9:
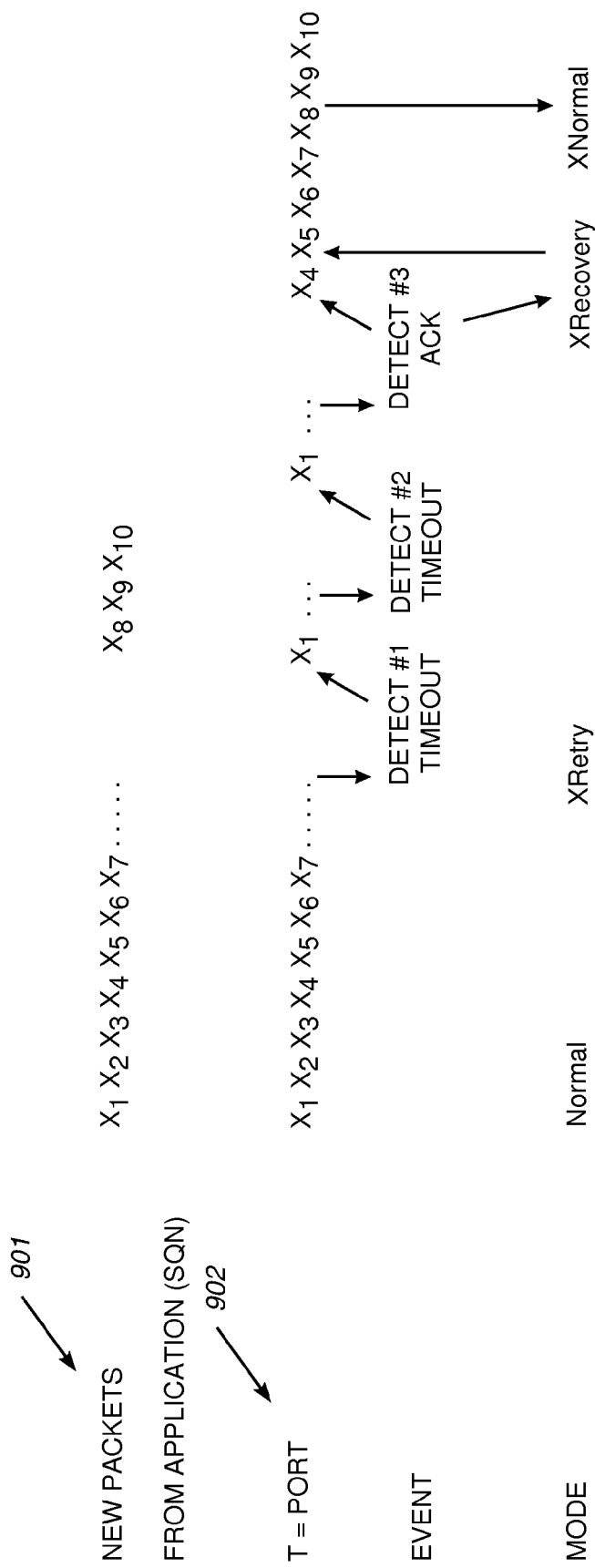
FIG. 9 is schematic of a high level example of a series of packets being transmitted to a node as the node moves through four different transmission states according to an embodiment of the present invention.

Example of Packets Being Transmitted to a Node as the Node Moves Through Four Modes FIG. 9 shows a high level example of a series of packets being transmitted to a node as the node moves through the four modes discussed above. At first packets with sequence number 1,2,3,4,5,6,7,8,9,10 are sent in (901). The node is normal, so these packets come straight through (at 902) 1,2,3,4,5,6,7. After 7 has been transmitted (in this example) the Retry State machine 242 has (independently) detected that SQN 1 has not been ACK'ed and has expired on the retry timer. The Retry State machine 242 moves the state of the node to "RETRY" and indicates that SQN #1 and only SQN #1 is to be retransmitted, which is then executed by the TX port 902. The Retry State machine 242 subsequently detects a second timeout on that node and indicates that SQN #1 is to be transmitted again. Ultimately at a later point in time, an ACK for #3 is detected so the LASTACK SQN for this node is updated to 3. When any packet for this node is seen by the Retry Evaluator 224, the state for this node is changed to "RECOVERY" and the N2G SQN is updated to "4".

When SQN 4,5,6, . . . for this node is seen by the Retry Evaluator 224, it indicates that this packet be retransmitted, and executes them in order so that 4,5,6,7,8,9,10 are transmitted in that order at the TX port 902. Once packet #8 has been transmitted, the Retry State Machine 242 moves the mode of that node to "NORMAL" since packet 8 represents a packet that had never been previously transmitted.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for transmitting at least one packet across a network destined for reception by at least one network endpoint, the method comprising:

processing sequentially a plurality of packets from a queue to be sent to at least one network endpoint;

transmitting a first packet from the plurality of packets to the at least one network endpoint;

transmitting, subsequent to the transmitting the first packet, at least one additional packet from the plurality of packets to the at least one network endpoint;

determining, subsequent to the transmitting the at least one additional packet, that the first packet transmitted to the at least one network endpoint has not been acknowledged;

transmitting, in response to the determining that the first packet has not been acknowledged by the at least one network endpoint, a first retry packet associated with the first packet to the at least one network endpoint;

suspending, in response to the determining that the first packet has not been acknowledged, retransmission of the at least one additional packet due to a lack of receipt acknowledgement by the at least one network endpoint;

suspending, in response to the determining that the first packet has not been acknowledged, transmission of packets other than the first retry packet to the at least one network endpoint;

determining that the first retry packet has been acknowledged by the at least one network endpoint; and resuming, in response to the determining that the first retry packet has been acknowledged and regardless of a number of packets awaiting acknowledgement, transmission of remaining packets in the plurality of packets to the at least one network endpoint.

2. The method of claim 1, further comprising:

starting, in response to the transmitting the first packet, a plurality of timers associated with the first packet.

3. The method of claim 2, wherein a first timer in the plurality of timers is associated with a first given threshold for receiving an acknowledgement from the at least one network endpoint.

4. The method of claim 3, wherein the determining that the first retry packet transmitted to the at least one network endpoint has not been acknowledged further comprises:
monitoring for an acknowledgement packet associated with the first retry packet transmitted to the at least one network endpoint; and
determining, in response to a value associated with the first timer being greater than the first given threshold, that the acknowledgement packet has not been received after the first given threshold.

5. The method of claim 2, further comprising:
monitoring at least one timer in the plurality of timers that is associated with a given threshold for determining when suspend all packet transmissions to the at least one network endpoint;
determining, in response to the monitoring, that the given threshold associated with the at least one timer, has occurred; and
suspending, in response to the determining that the threshold has occurred, all packet transmissions to the at least one network endpoint.

6. The method of claim 5 further comprising:
performing error recovery on the at least one network endpoint.

7. The method of claim 1, wherein packets within the plurality of packets for each network endpoint in the least one network endpoint are ordered according to a sequence number with respect to one, and wherein each packet is transmitted to its respective network endpoint in an order corresponding to its respective sequence number.

8. The method of claim 1, wherein the suspending transmission of packets other than the first retry packet to the at least one network endpoint further comprises suspending transmissions of packets other than the first retry packet to the at least one network endpoint, wherein a transmission of packets destined for reception by other network endpoints are not suspended.

9. The method of claim 1, wherein the transmitting of the first retry packet further comprises:
determining that the first packet is an earliest packet transmitted to the at least one network endpoint without an associated acknowledgment packet; and
transmitting, in response to the determining, the first retry data packet to the at least one network endpoint, wherein no other packets, regardless of a number of packets awaiting acknowledgement, are transmitted to the at least one network endpoint until an acknowledgement packet associated with the first retry packet is received from the at least one network endpoint.

10. The method of claim 9, further comprising:
starting, in response to the transmitting, at least one timer associated with the first retry packet.

11. The method of claim 9, further comprising:
starting a second timer upon a first transmission of the first retry packet, wherein the second timer continues to run until an acknowledgment associated with the transmission of the first retry packet is received from the at least one network endpoint;
determining, based on the second timer, that a second given threshold has occurred for packets being retried to the at least one network endpoint; and
retransmitting, in response determining that the second threshold has occurred, the first retry packet to the at least one network endpoint using an alternate transmission route that is different than a transmission route used to previously transmit the first retry packet.

12. The method of claim 1, further comprising:
receiving an acknowledgement packet from the at least one network endpoint;
analyzing a sequence number associated with the acknowledgement packet;
determining, in response to the analyzing, that the sequence number is greater than a current sequence number associated with the at least one network endpoint and is at least one of less than and equal to a sequence number associated with a last transmitted packet in a sequence of packets transmitted to the at least one network endpoint;
storing, in response to the determining that the sequence number is greater than a current sequence number associated with the at least one network endpoint and is at least one of less than and equal to a sequence number associated with a last transmitted packet in a sequence of packets transmitted to the at least one network endpoint, the sequence number as a received acknowledgement from the at least one destination network; and
discarding, in response to determining at least one of the sequence number is greater than a current sequence number associated with the at least one network endpoint and is at least one of less than and equal to a sequence number associated with a last transmitted packet in a sequence of packets transmitted to the at least one network endpoint, the acknowledgment packet.

13. An information processing system for transmitting at least one packet across a network destined for reception by at least one network endpoint, the information processing comprising:
a memory;
a processor communicatively coupled to the memory
a queue adapted to storing a plurality of packets to be sent to a network endpoint; and
a packet manager communicatively to the memory and the processor, wherein the packet manager is adapted to:
processing sequentially a plurality of packets from a queue to be sent to at least one network endpoint;
transmitting a first packet from the plurality of packets to the at least one network endpoint;
transmitting, subsequent to the transmitting the first packet, at least one additional packet from the plurality of packets to the at least one network endpoint;
determining, subsequent to the transmitting the at least one additional packet, that the first packet transmitted to the at least one network endpoint has not been acknowledged;
transmitting, in response to the determining that the first packet has not been acknowledged by the at least one network endpoint, a first retry packet associated with the first packet to the at least one network endpoint;
suspending, in response to the determining that the first packet has not been acknowledged, retransmission of the at least one additional packet due to a lack of receipt acknowledgement by the at least one network endpoint;
suspending, in response to the determining that the first packet has not been acknowledged, transmission of packets other than the first retry packet to the at least one network endpoint;
determining that the first retry packet has been acknowledged by the at least one network endpoint; and
resuming, in response to the determining that the first retry packet has been acknowledged and regardless of a number of packets awaiting acknowledgement, transmission of remaining packets in the plurality of packets to the at least one network endpoint.

14. The information processing system of claim 13, wherein the packet manager further:
   starts in response to the transmitting the first packet, a plurality of timers associated with the first packet.

15. The information processing system of claim 14, wherein a first timer in the plurality of timers is associated with a first given threshold for receiving an acknowledgement from the at least one network endpoint.

16. The information processing system of claim 15, wherein the determining that the first retry packet transmitted to the at least one network endpoint has not been acknowledged further comprises:
   monitoring for an acknowledgement packet associated with the first retry packet transmitted to the at least one network endpoint; and
   determining, in response to a value associated with the first timer being greater than the first given threshold, that the acknowledgement packet has not been received after the first given threshold.

17. The information processing system of claim 14, wherein the packet manager is further for:
   monitoring at least one timer in the plurality of timers that is associated with a given threshold for determining when suspend all packet transmissions to the at least one network endpoint;
   determining, in response to the monitoring, that the given threshold associated with the at least one timer, has occurred; and
   suspending, in response to the determining that the threshold has occurred, all packet transmissions to the at least one network endpoint.

18. The information processing system of claim 17, wherein the packet manager is further adapted to:
   performing error recovery on the at least one network endpoint.

19. The information processing system of claim 13, wherein the suspending transmission of packets other than the first retry packet to the at least one network endpoint by the packet manager further comprises:
   suspending transmissions of packets other than the first retry packet to the at least one network endpoint, wherein a transmission of packets destined for reception by other network endpoints are not suspended.

20. The information processing system of claim 13, wherein the transmitting of the first retry packet further comprises:
   determining that the first packet is an earliest packet transmitted to the at least one network endpoint without an associated acknowledgment packet; and
   transmitting, in response to the determining, the first retry data packet to the at least one network endpoint, wherein no other packets, regardless of a number of packets awaiting acknowledgement, are transmitted to the at least one network endpoint until an acknowledgement packet associated with the first retry packet is received from the at least one network endpoint.

21. The information processing system of claim 20, wherein the packet manager is further adapted to:
   starting a second timer upon a first transmission of the first retry packet, wherein the second timer continues to run until an acknowledgment associated with the transmission of the first retry packet is received from the at least one network endpoint;
   determining, based on the second timer, that a second given threshold has occurred for packets being retried to the at least one network endpoint; and
   retransmitting, in response determining that the second threshold has occurred, the first retry packet to the at least one network endpoint using an alternate transmission route that is different than a transmission route used to previously transmit the first retry packet.

22. A computer readable medium tangibly encoded with a machine executable program for transmitting at least one packet across a network destined for reception by at least one network endpoint, the machine executable program comprising instructions for:
   processing sequentially a plurality of packets from a queue to be sent to at least one network endpoint;
   transmitting a first packet from the plurality of packets to the at least one network endpoint;
   transmitting, subsequent to the transmitting the first packet, at least one additional packet from the plurality of packets to the at least one network endpoint;
   determining, subsequent to the transmitting the at least one additional packet, that the first packet transmitted to the at least one network endpoint has not been acknowledged;
   transmitting, in response to the determining that the first packet has not been acknowledged by the at least one network endpoint, a first retry packet associated with the first packet to the at least one network endpoint;
   suspending, in response to the determining that the first packet has not been acknowledged, retransmission of the at least one additional packet due to a lack of receipt acknowledgement by the at least one network endpoint;
   suspending, in response to the determining that the first packet has not been acknowledged, transmission of packets other than the first retry packet to the at least one network endpoint;
   determining that the first retry packet has been acknowledged by the at least one network endpoint; and
   resuming, in response to the determining that the first retry packet has been acknowledged and regardless of a number of packets awaiting acknowledgement, transmission of remaining packets in the plurality of packets to the at least one network endpoint.

23. The computer readable medium of claim 22, wherein further comprising instructions for:
   starting, in response to the transmitting the first packet, a plurality of timers associated with the first packet.

24. The computer readable medium of claim 23, wherein a first timer in the plurality of timers is associated with a first given threshold for receiving an acknowledgement from the at least one network endpoint.

25. The computer readable medium of claim 22, wherein the instructions for suspending transmission of packets other than the first retry packet to the at least one network endpoint further comprise instructions for:
   suspending transmissions of packets other than the first retry packet to the at least one network endpoint, wherein a transmission of packets destined for reception by other network endpoints are not suspended.

26. The computer readable medium of claim 25, further comprising instructions for:
   monitoring at least one timer in the plurality of timers that is associated with a given threshold for determining when suspend all packet transmissions to the at least one network endpoint;

determining, in response to the monitoring, that the given threshold associated with the at least one timer, has occurred; and suspending, in response to the determining that the threshold has occurred, all packet transmissions to the at least one network endpoint.

27. The computer readable medium of claim 22, wherein the instructions for transmitting the first retry packet further comprise instructions for:

determining that the first packet is an earliest packet transmitted to the at least one network endpoint without an associated acknowledgment packet; and transmitting, in response to the determining, the first retry data packet to the at least one network endpoint, wherein no other packets, regardless of a number of packets awaiting acknowledgement, are transmitted to the at least one network endpoint until an acknowledgement packet associated with the first retry packet is received from the at least one network endpoint.

28. The computer readable medium of claim 27, further comprising instructions for:

starting a second timer upon a first transmission of the first retry packet, wherein the second timer continues to run until an acknowledgment associated with the transmission of the first retry packet is received from the at least one network endpoint;

determining, based on the second timer, that a second given threshold has occurred for packets being retried to the at least one network endpoint; and retransmitting, in response determining that the second threshold has occurred, the first retry packet to the at least one network endpoint using an alternate transmission route that is different than a transmission route used to previously transmit the first retry packet.

29. A network device, comprising:

a memory;

a processor communicatively coupled to the memory;

at least one network adapter communicatively coupled to the memory and the processor;

a queue adapted to storing a plurality of packets to be sent to at least network endpoint; and a packet manager communicatively to the memory, the queue, and the processor, wherein the packet manager is adapted to:

processing sequentially a plurality of packets from a queue to be sent to at least one network endpoint;

transmitting a first packet from the plurality of packets to the at least one network endpoint;

transmitting, subsequent to the transmitting the first packet, at least one additional packet from the plurality of packets to the at least one network endpoint;

determining, subsequent to the transmitting the at least one additional packet, that the first packet transmitted to the at least one network endpoint has not been acknowledged;

transmitting, in response to the determining that the first packet has not been acknowledged by the at least one network endpoint, a first retry packet associated with the first packet to the at least one network endpoint;

suspending, in response to the determining that the first packet has not been acknowledged, retransmission of the at least one additional packet due to a lack of receipt acknowledgement by the at least one network endpoint;

suspending, in response to the determining that the first packet has not been acknowledged, transmission of packets other than the first retry packet to the at least one network endpoint;

determining that the first retry packet has been acknowledged by the at least one network endpoint; and resuming, in response to the determining that the first retry packet has been acknowledged and regardless of a number of packets awaiting acknowledgement, transmission of remaining packets in the plurality of packets to the at least one network endpoint.

30. The network device of claim 29, wherein the packet manager further:

starts in response to the transmitting the first packet, a plurality of timers associated with the first packet.

31. The network device of claim 30, wherein a first timer in the plurality of timers is associated with a first given threshold for receiving an acknowledgement from the at least one network endpoint.

32. The network device of claim 31, wherein the determining that the first retry packet transmitted to the at least one network endpoint has not been acknowledged further comprises:

monitoring for an acknowledgement packet associated with the first retry packet transmitted to the at least one network endpoint; and determining, in response to the first timer, that the acknowledgement packet has not been received after the first given threshold.

33. The network device of claim 29, wherein the suspending transmission of packets other than the first retry packet to the at least one network endpoint by the packet manager further comprises:

suspending transmissions of packets other than the first retry packet to the at least one network endpoint, wherein a transmission of packets destined for reception by other network endpoints are not suspended.

34. The network device of claim 29, wherein the transmitting of the first retry packet further comprises:

determining that the first packet is an earliest packet transmitted to the at least one network endpoint without an associated acknowledgment packet; and transmitting, in response to the determining, the first retry data packet to the at least one network endpoint, wherein no other packets, regardless of a number of packets awaiting acknowledgement, are transmitted to the at least one network endpoint until an acknowledgement packet associated with the first retry packet is received from the at least one network endpoint.

35. The network device of claim 34, wherein the packet manager is further adapted to:

starting a second timer upon a first transmission of the first retry packet, wherein the second timer continues to run until an acknowledgment associated with the transmission of the first retry packet is received from the at least one network endpoint;

determining, based on the second timer, that a second given threshold has occurred for packets being retried to the at least one network endpoint; and retransmitting, in response determining that the second threshold has occurred, the first retry packet to the at least one network endpoint using an alternate transmission route that is different than a transmission route used to previously transmit the first retry packet.

* * * * *